(12) United States Patent
Meyers

(10) Patent No.: US 7,800,598 B2
(45) Date of Patent: Sep. 21, 2010

(54) LOCATING DISPLAY ITEMS ON MULTIPLE DISPLAY DEVICES

(75) Inventor: Brian R. Meyers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1223 days.

(21) Appl. No.: 11/364,776

(22) Filed: Feb. 27, 2006

(65) Prior Publication Data

US 2007/0200791 A1 Aug. 30, 2007

(51) Int. Cl.
*G09G 5/00* (2006.01)
(52) U.S. Cl. .............................. 345/204; 345/55; 345/39
(58) Field of Classification Search ................. 345/204, 345/55, 39
See application file for complete search history.

(56) References Cited

U.S. PATENT DOCUMENTS

| | | | |
|---|---|---|---|
| 5,532,830 A * | 7/1996 | Schuler | 386/125 |
| 5,767,919 A * | 6/1998 | Lee et al. | 725/37 |
| 7,142,192 B2 | 11/2006 | De Waal | |
| 2003/0067438 A1 * | 4/2003 | Chen | 345/156 |

* cited by examiner

*Primary Examiner*—Richard Hjerpe
*Assistant Examiner*—Leonid Shapiro
(74) *Attorney, Agent, or Firm*—Woodcock Washburn LLP

(57) ABSTRACT

In a multiple-display configuration comprising multiple display devices, the display device on which a display item, such as a mouse cursor, is located, is indicated without obscuring the view of any information being rendered on any display device. In an exemplary configuration, light emitting devices, such as LEDs for example, are located on the periphery of each display device. To indicate that the display item is located on a specific display device, the LEDs associated with that display device are activated.

14 Claims, 9 Drawing Sheets

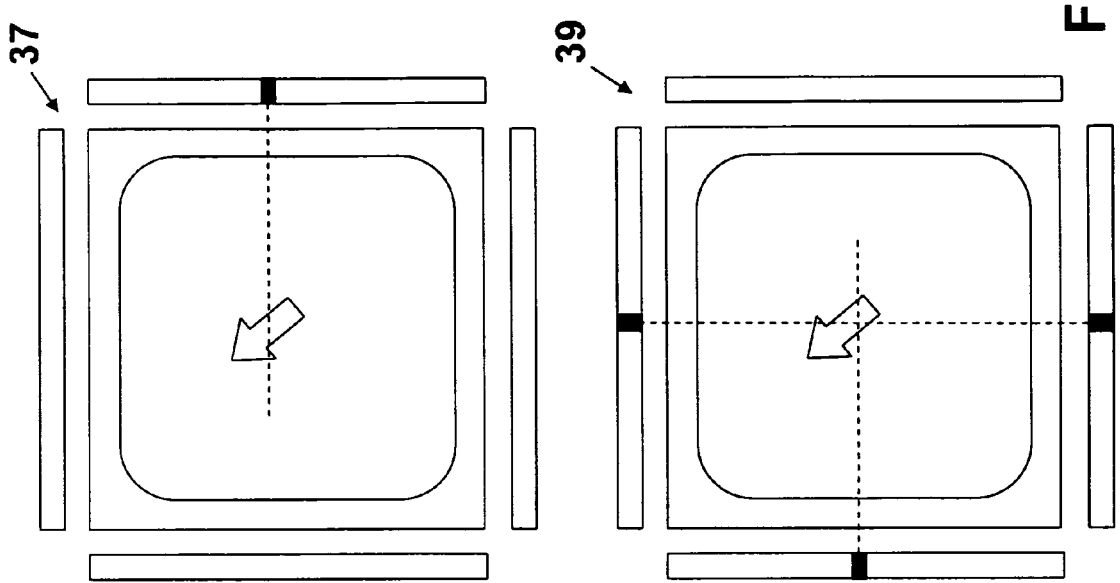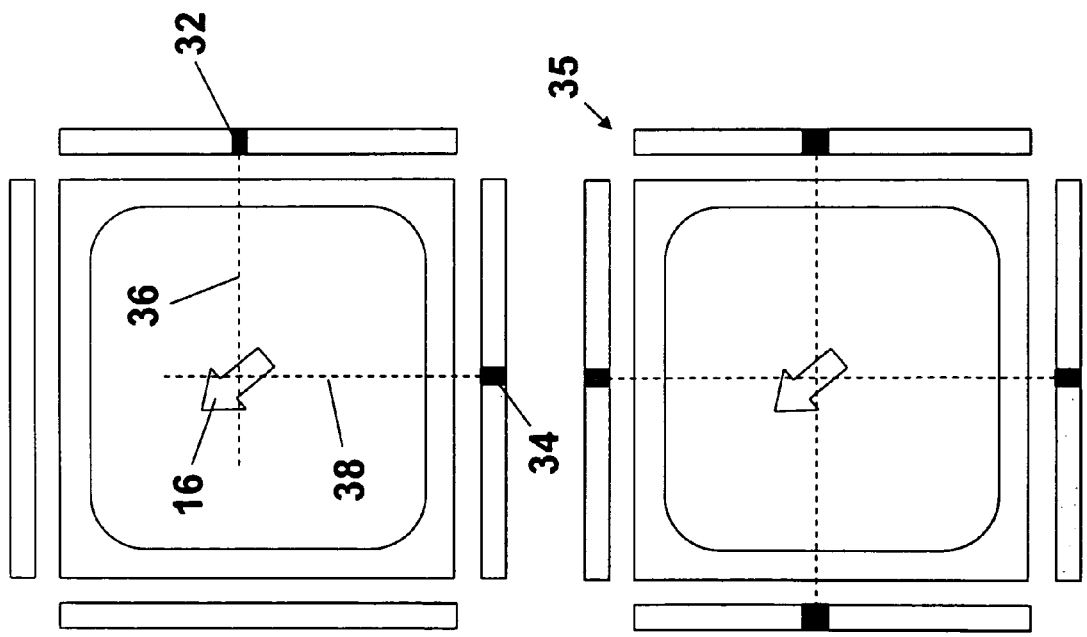
FIGURE 5

LOCATING DISPLAY ITEMS ON MULTIPLE DISPLAY DEVICES

TECHNICAL FIELD

The technical field generally is related to displays and more specifically related to locating display items on multiple display devices.

BACKGROUND

It is not uncommon to couple multiple display devices to a single processor. This arrangement provides a larger display area than can be provided by a single display device. Utilizing multiple display devices can be confusing however, when attempting to locate a display item, such as a mouse cursor. Many users have been observed moving a mouse vigorously (e.g., shaking, wiggling until movement of the display cursor is noticed. This can be frustrating and time consuming. Or they install programs that draw circles or some other pattern to make the mouse easier to see. These techniques utilize pixels which could otherwise be used for rendering other substantive information, thus obscuring the user's view of underlying substantive information. Also, the motion of the cursor can become an annoying distraction when the user is attempting to concentrate on the underlying information being rendered on the display device. Utilizing multiple display devices also can be frustrating when trying to determine which display device is rendering a recently received notification, such as an indication that an email has been received for example. Further, utilizing multiple displays can be especially frustrating when a drop down menu on a display device prevents a user from performing non-menu related operations, and the display cursor is located at a display device other than the display device on which the menu is being rendered. This typically requires the user to first locate the display cursor and move it to the menu, before performing the required menu operations.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

In an exemplary embodiment, lights located on the periphery of a display device are utilized to indicate the location of a display item. In a configuration comprising multiple display devices, lights are coupled to each display device. Lights of a display device are activated (e.g., lit, turned on) to indicate that the item of interest, such as the mouse cursor, is being rendered (located) on that particular display device. The lights do not utilize pixels of a display device and do not obstruct the user's view of information being rendered on the display device. The lights can comprise any appropriate type of lighting, such as light emitting diodes (LEDs), optical fibers, light pipes, plasma displays, liquid crystal displays (LCDs), fluorescent devices, incandescent devices, reflective devices, or a shutter that mechanically changes the appearance of the display device when activated, for example.

BRIEF DESCRIPTION OF THE DRAWINGS

The foregoing summary, as well as the following detailed description, is better understood when read in conjunction with the appended drawings. For the purpose of illustrating locating display items on multiple display devices, there is shown in the drawings exemplary constructions thereof; however, locating display items on multiple display devices is not limited to the specific methods and instrumentalities disclosed. In the drawings:

FIG. 5 is an illustration of light emitting devices comprising markers for indicating the location of display item on a display device;

DETAILED DESCRIPTION OF ILLUSTRATIVE EMBODIMENTS

Figure 1:
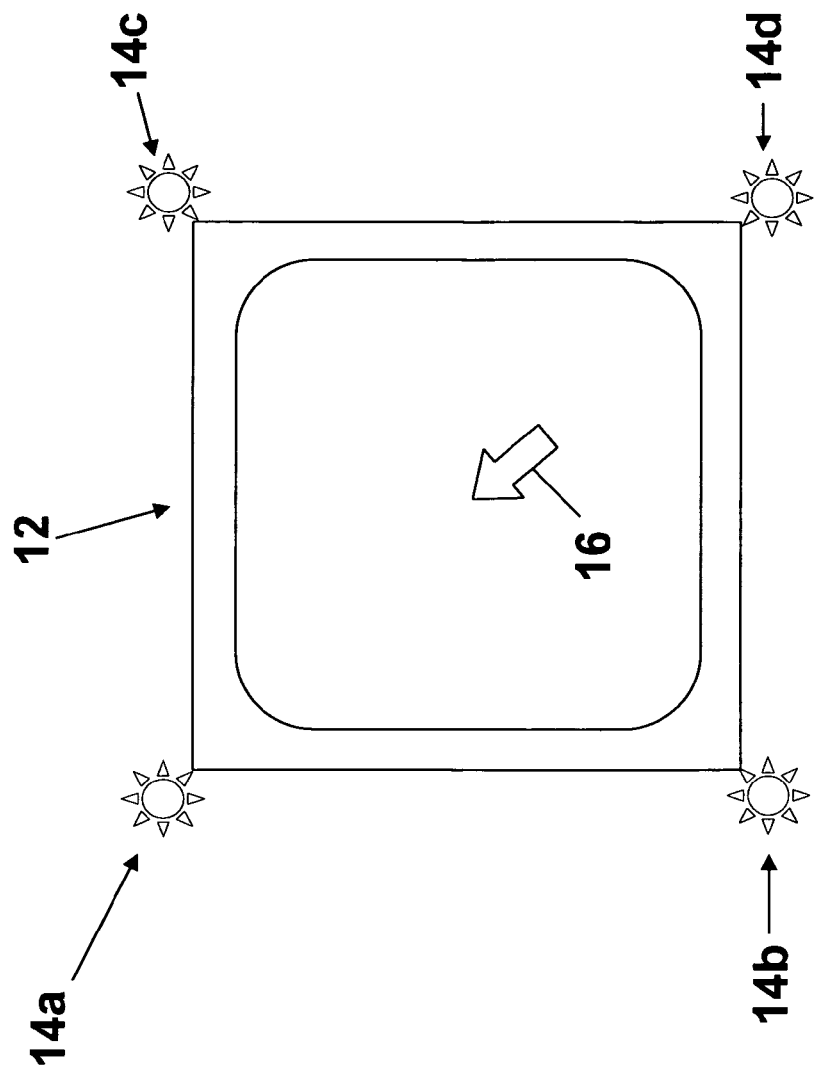
FIG. 1 is an exemplary diagram depicting a display device, light emitting devices, and a display item.

FIG. 1 is a diagram depicting a display device 12, light emitting devices 14a-14d, and a display item 16. In an exemplary embodiment, at least one light emitting device 14a-14d is activated (also referred to as being lit or turned on) to indicate that display item 16 is rendered on display device 12. Display device 12 can comprise any appropriate display device such as a monitor, a liquid crystal display (LCD) device, a light emitting diode (LED) display, a plasma display device, a cathode ray tube display device, or a combination thereof, for example. Display device 12 can be a part of another device, such as a processor, a mobile PC, a desktop PC, a personal digital assistant (PDAs), a portable phone, a television, or a combination thereof, for example.

Light emitting devices 14 can comprise any appropriate number of light emitting devices. Light emitting devices 14 can comprise any appropriate type of light emitting device, such as an LED, an optical fiber, a light pipe, a plasma device, a fluorescent device, an incandescent device, a reflective device, or a combination thereof, for example. In an exemplary embodiment, light emitting device 14 comprises a shutter that can be opened and closed. The shutter can change the appearance of the display device by making, for example, a red reflective strip visible when opened or showing a black strip when closed. In other exemplary embodiments, light emitting device 14 can comprise a mechanism attached or built into the display device. The mechanism can comprise a servo, or the like, that swivels or flips a paddle having one side showing one color, and the other side showing another color (e.g., red and black). In yet another embodiment, the mechanism can comprise E-Ink technology having the ability to change colors. Display item 16 can comprise any appropriate display item, such as a mouse cursor, a display window, a notification, or the like, for example.

Figure 2:
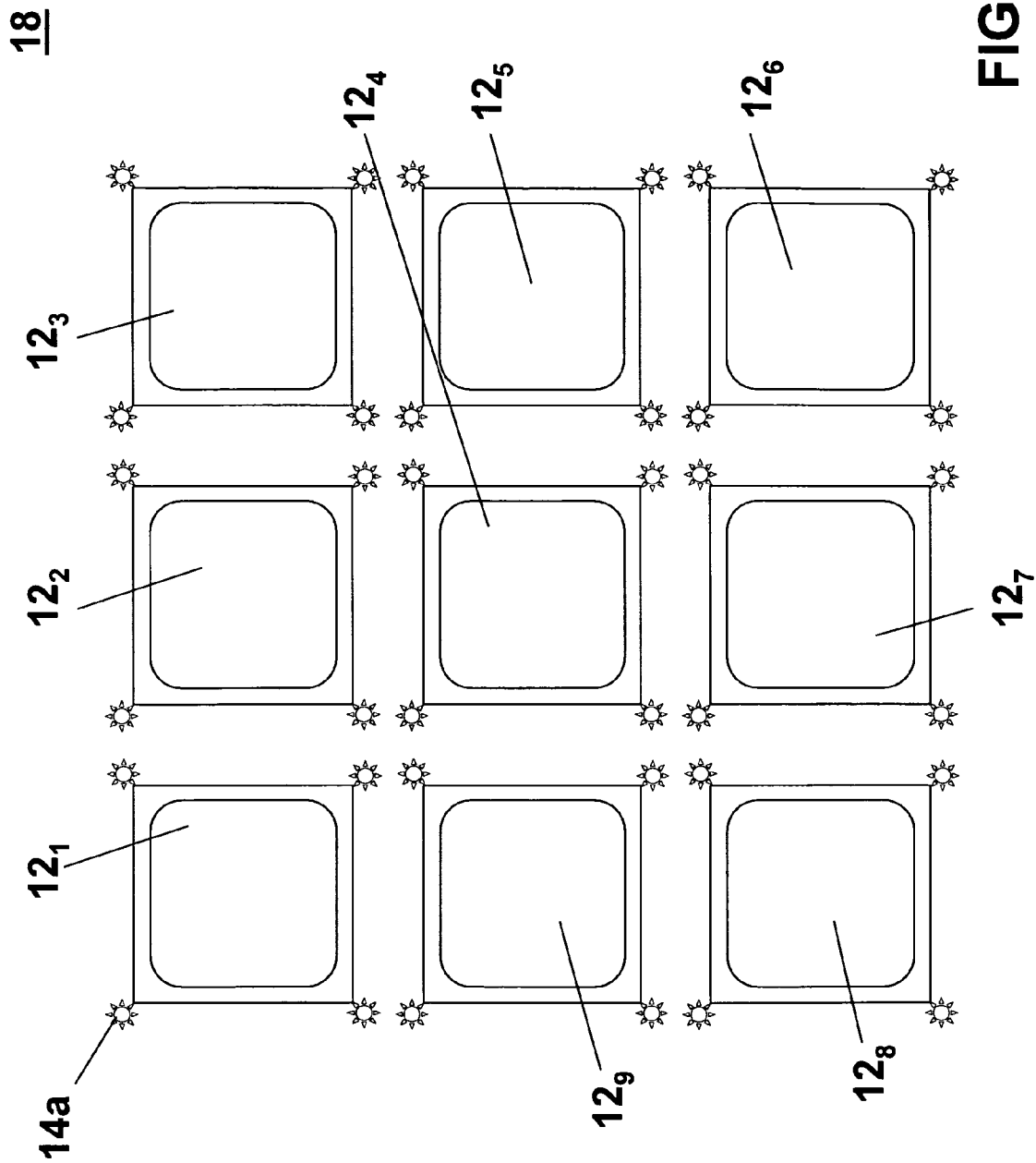
FIG. 2 is a depiction of an exemplary system for locating display items across multiple display devices.

FIG. 2 is a depiction of an exemplary system 18 for locating display items across multiple display devices $12_1$ through $12_9$. System 18 comprises multiple light emitting devices. Only light emitting device 14a is labeled in FIG. 2 for the sake of clarity. In an exemplary embodiment, each display device ($12_1$ through $12_9$) has associated therewith at least one light emitting device. In operation, at least one light emitting device associated with an active display device is activated. An active display device, as described herein, is a display device on which a display item of interest is located. And, in an exemplary embodiment, light emitting devices not associated with an active display device are not activated.

Figure 3:
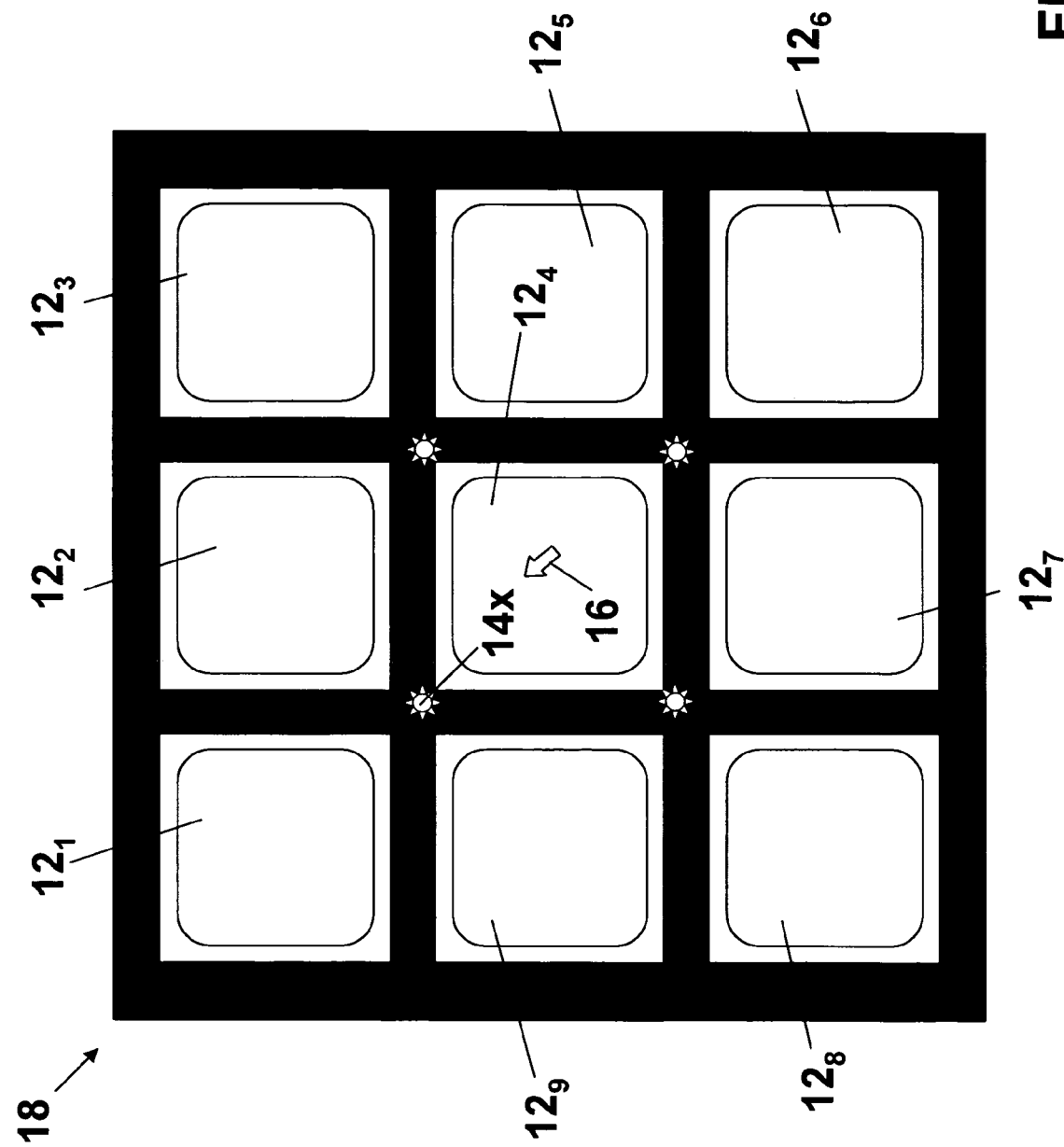
FIG. 3 is a diagram of the exemplary system depicting an active display device having its associated light emitting devices activated.

FIG. 3 is a diagram of the exemplary system 18 depicting active display device 124 having its associated light emitting devices activated. Display device $12_4$ is the active display device because the display item 16 is located thereon (being rendered). Only one of the four light emitting devices associated with display device $12_4$ is labeled (14x) for the sake of clarity. As the display item 16 (e.g., display cursor) is moved to another display device, the light emitting device(s) associated with the other display device (the new active display device) will be activated.

Any appropriate number and type of light emitting devices can be associated with a display device. As described above, a light emitting device can comprise an LED, an optical fiber, a light pipe, a plasma display, an LCD, a fluorescent device, an incandescent device, a reflective device, a shutter changing the visible appearance, or a combination thereof, for example. Light emitting devices are located proximate the display device to which it is associated. Light emitting devices can be attached to display devices, positioned proximate to display devices, or a combination thereof. Locating light emitting devices proximate to a display device provides a visual cue as to the association between the light emitting device(s) and the display device. Further, the configuration of light emitting devices can provide a visual indication as to the association between a light emitting device(s) and a display device. For example, configuring light emitting devices around the perimeter of a display device indicates that the display device within the perimeter is associated with the light emitting devices.

Figure 4:
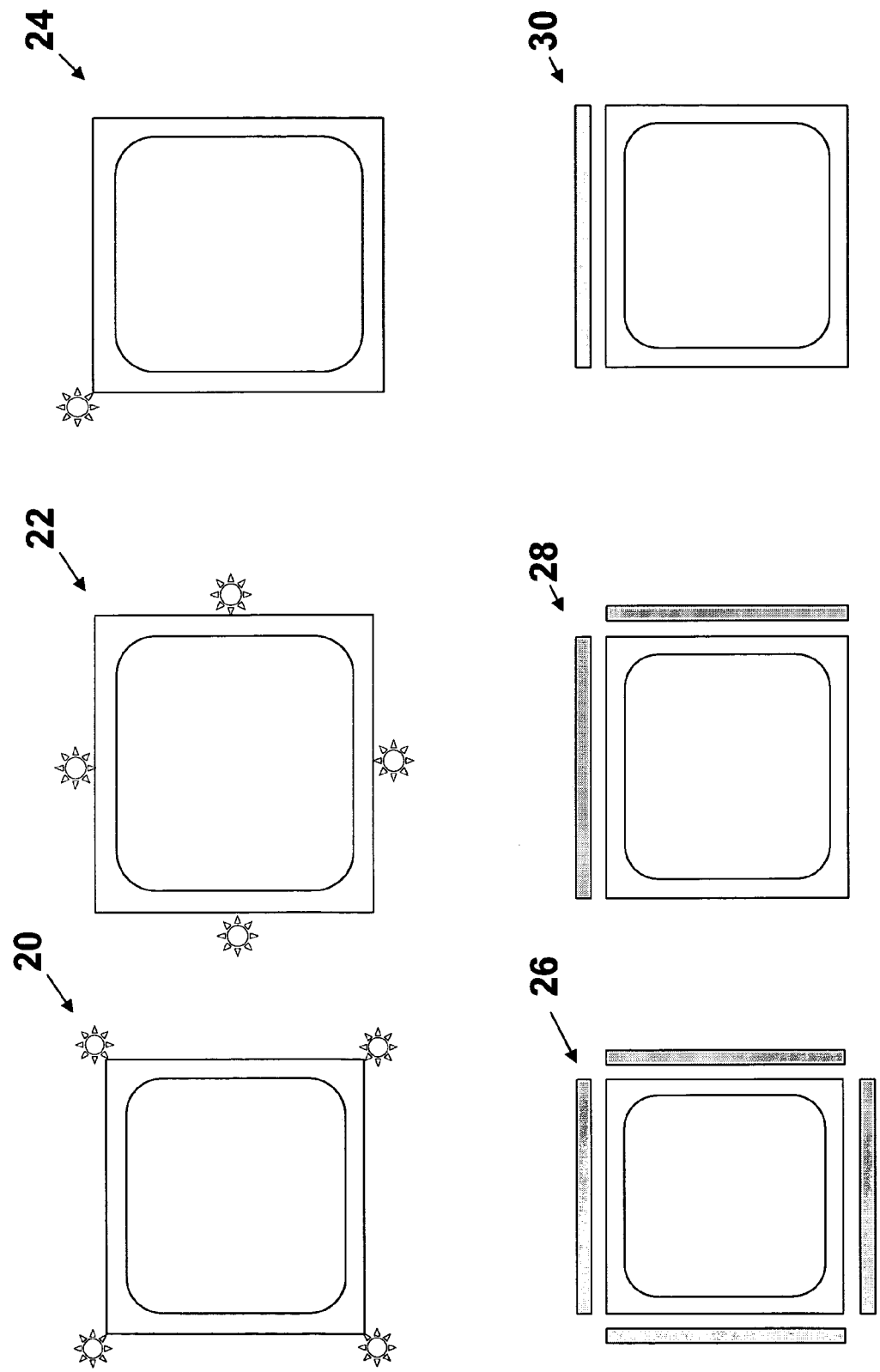
FIG. 4 depicts various exemplary configurations and numbers of light emitting devices associated with a display device.

FIG. 4 depicts various exemplary configurations and numbers of light emitting devices associated with a display device. Configuration 20 depicts four light emitting devices located proximate to and around the perimeter of the display device. The light emitting devices of configuration 20 are located at the corners of the display device. Configuration 22 depicts four light emitting devices located proximate to and around the perimeter of the display device, midway between the corners of the display device. Configuration 24 depicts a single light emitting located proximate the display device, at one of the corners of the display device. It is emphasized that the configurations depicted in FIG. 4 are exemplary, and that other configurations, too numerous to depict, are appropriate.

Configurations 26, 28, and 30 depict elongated light emitting devices. Elongated light emitting devices can comprise, for example, an optical fiber, a fluorescent lamp, a row of individual light emitting devices, any appropriate light pipe, or a combination thereof, for example. Configuration 26 depicts four light emitting devices located proximate to and around the perimeter of the display device. Configuration 28 depicts two light emitting devices located proximate to two contiguous sides of the display device. Configuration 30 depicts a single light emitting device located proximate to one side of the display device.

In an exemplary embodiment, the location of a display item is indicated by a marker(s) on the light emitting devices. FIG. 5 is an illustration of light emitting devices comprising markers 32 and 34 for indicating the location of display item 16 on the display device. The light emitting devices depicted in FIG. 5 comprise elongated light emitting devices. Display item 16 is located at the intersection of lines 36 and 38 projecting from the markers 32 and 34, respectively. In an exemplary embodiment, lines 36 and 38 are not rendered on the display device. Rather, a viewer visualizes lines projecting from the markers. This provides a visual indication of the location on the active display device of the display item of interest. Any number of markers can be utilized any in appropriate configuration. For example, in an exemplary embodiment, a single marker is utilized, and the display item is located somewhere along a line projected from the single marker, as depicted in configuration 37. In another exemplary embodiment, three markers are utilized as depicted in configuration 39. In yet another exemplary embodiment, four markers are utilized as depicted in configuration 35.

Figure 6:
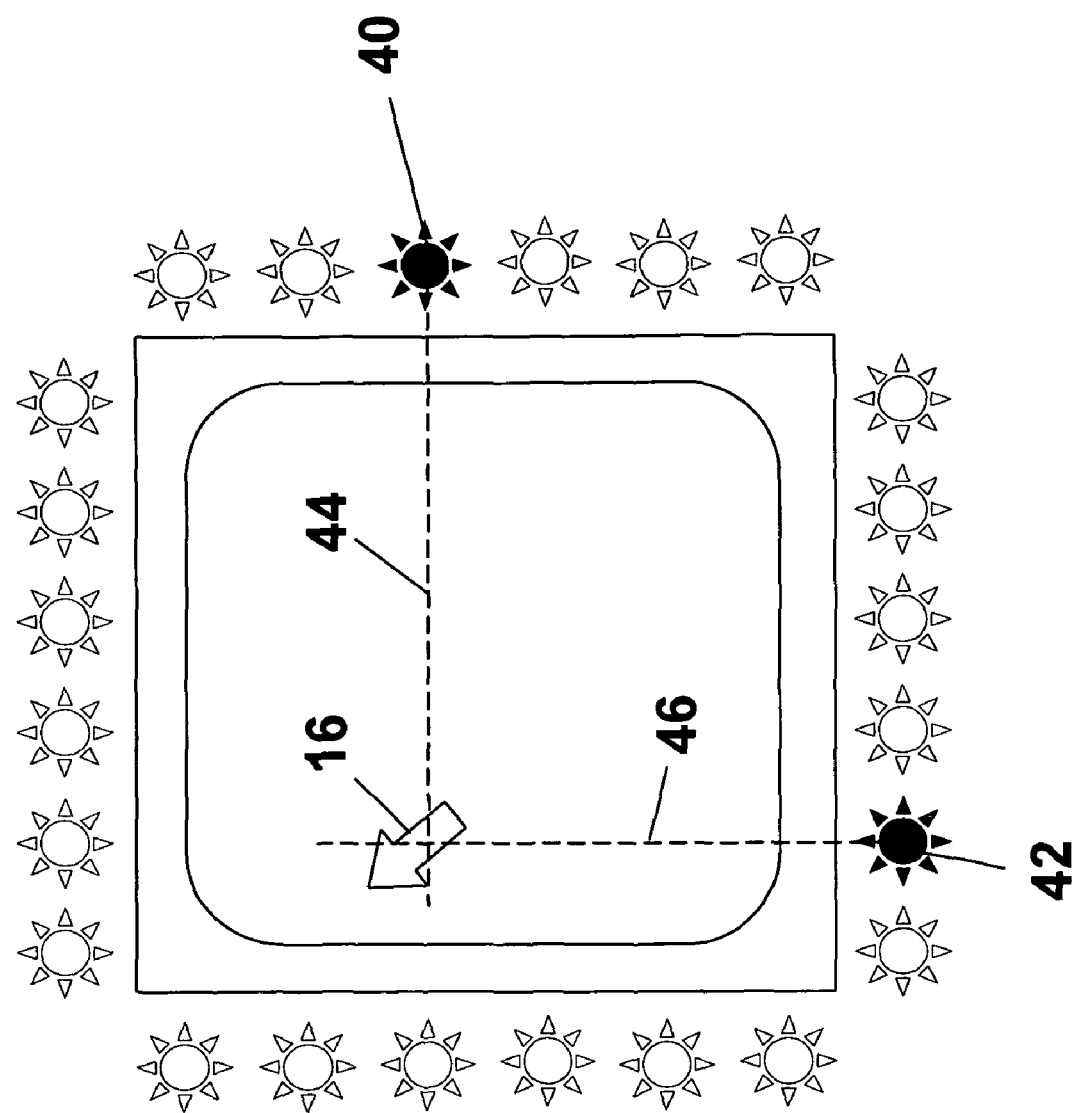
FIG. 6 is another illustration of light emitting devices comprising markers for indicating the location of display item on a display device.

FIG. 6 is another illustration of light emitting devices comprising markers 40 and 42 for indicating the location of display item 16 on the display device. The light emitting devices depicted in FIG. 6 comprise a row of individual light emitting devices. Display item 16 is located at the intersection of lines 44 and 46 projecting from the markers 40 and 42, respectively. Lines 44 and 46 are not rendered on the display device. Rather, a viewer visualizes lines projecting from the markers. This provides a visual indication of the location on the active display device of the display item of interest. Also, as described above, a single marker can be utilized, and the display item can be located somewhere along a line projected from the single marker.

Figure 7:
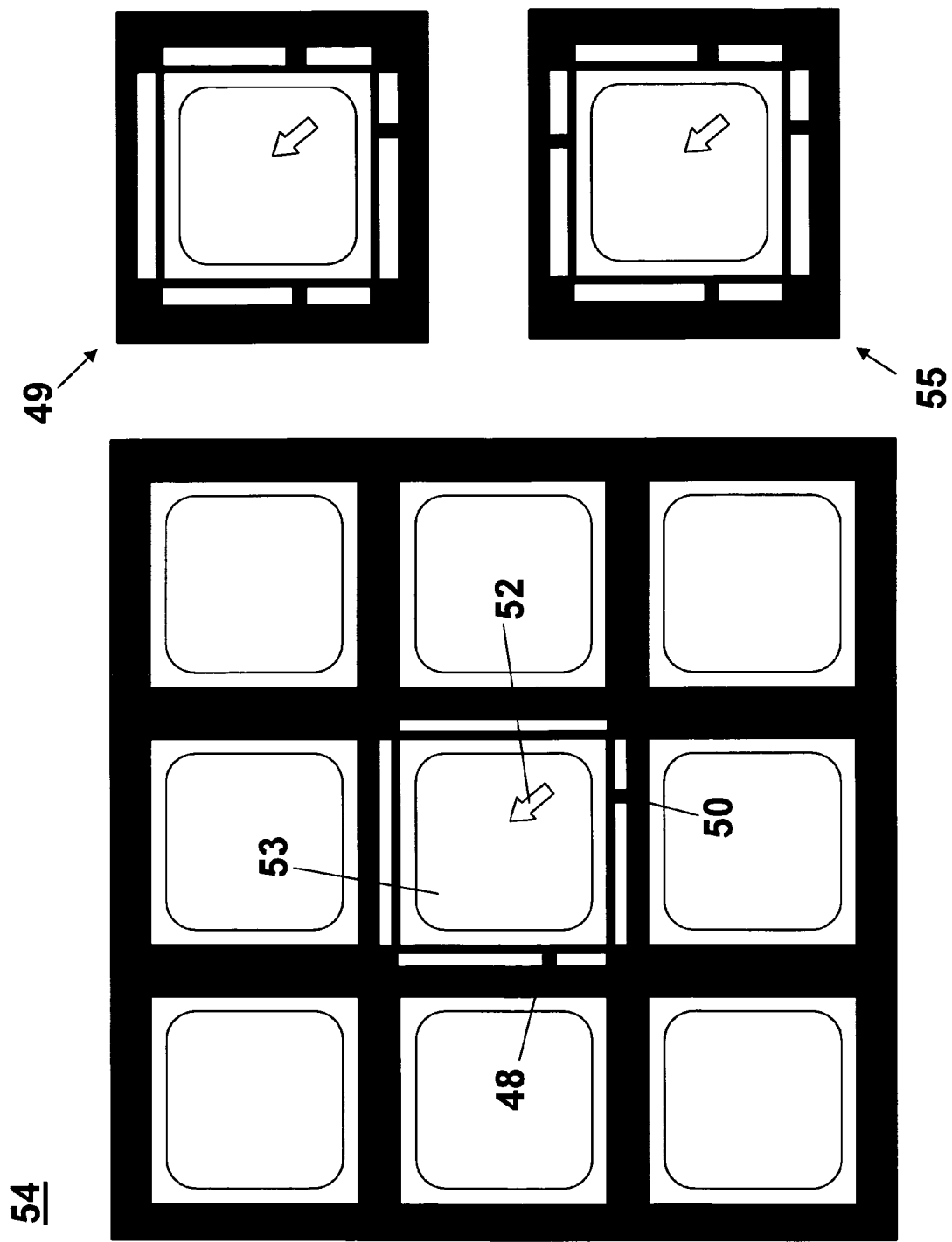
FIG. 7 is a diagram of an exemplary system depicting markers for indicating the location of display item on an active display.

FIG. 7 is a diagram of an exemplary system 54 depicting markers 48 and 50 for indicating the location of display item 52 on the active display 53. As shown in FIG. 7, a viewer can readily determine the location of display item 52 by visualizing the intersection of lines projecting from markers 48 and 50. The viewer's view of information being rendered on the active display is not obstructed by markers 48 and 50. Any number of markers can be utilized in any appropriate configuration. For example, three markers can be utilized as depicted in configuration 49, and four markers can be utilized as depicted in configuration 55.

Figure 8:
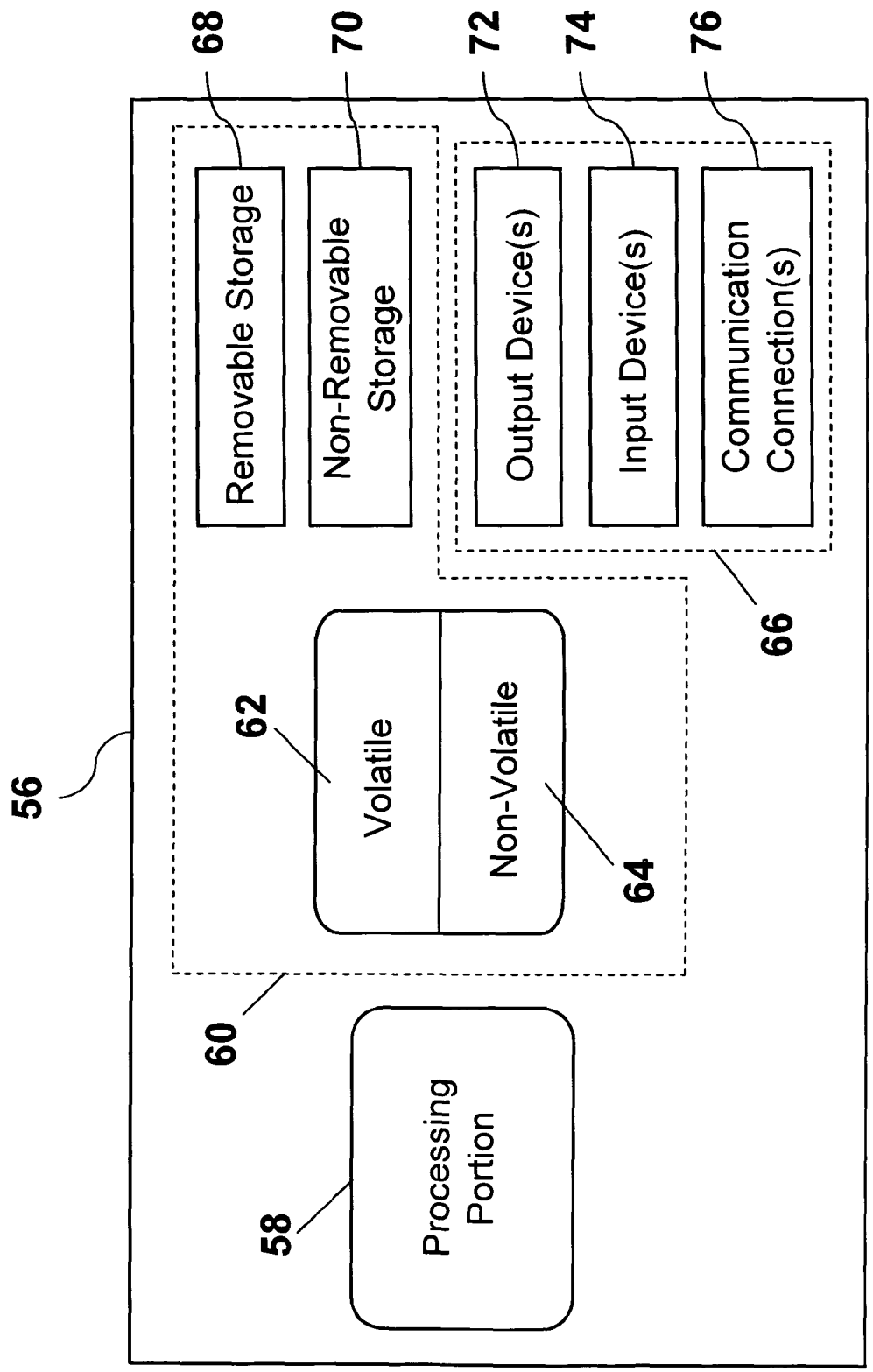
FIG. 8 is a diagram of an exemplary computing device for locating a display item on multiple display devices.

FIG. 8 is a diagram of an exemplary computing device 56 for locating a display item on multiple display devices. Computing device 56 comprises a processing portion 58, a memory portion 60, and an input/output portion 66. The processing portion 58, memory portion 60, and input/output portion 66 are coupled together (coupling not shown in FIG. 8) to allow communications therebetween. Processing portion 58 is capable of locating a display item (determining on which display device the display item of interest is located), tracking a display item across multiple display devices, and activating light emitting devices associated with an active display device. Memory portion 60 is capable of storing all parameters/values associated with locating a display item on/across display devices, and activating light emitting devices associated with an active display. Input/output portion 66 is capable of providing and/or receiving the components described above utilized to locate a display item, track a display item across multiple display devices, and activate light emitting devices associated with an active display devices.

Computing device 56 can be implemented as a client processor and/or a server processor. In a basic configuration, computing device 56 can include at least one processing portion 58 and memory portion 60. Depending upon the exact configuration and type of processor, the memory portion 60 can be volatile (such as RAM) 62, non-volatile (such as ROM, flash memory, etc.) 64, or a combination thereof. Computing device 56 can have additional features/functionality. For example, computing device 56 can include additional storage (removable storage 68 and/or non-removable storage 70) including, but not limited to, magnetic or optical disks, tape, flash, smart cards or a combination thereof. Computer storage media, such as memory portion 60, 62, 64, 68, and 70, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the computing device 56. Any such computer storage media can be part of computing device 56.

Computing device 56 also can contain communications connection(s) 76 that allow computing device 56 to communicate with other devices. Communications connection(s) 76 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing device 56 also can have input device(s) 74 such as keyboard, mouse, pen, voice input device, touch input device, etc. Output device(s) 72 such as a display, speakers, printer, etc. also can be included.

Figure 9:
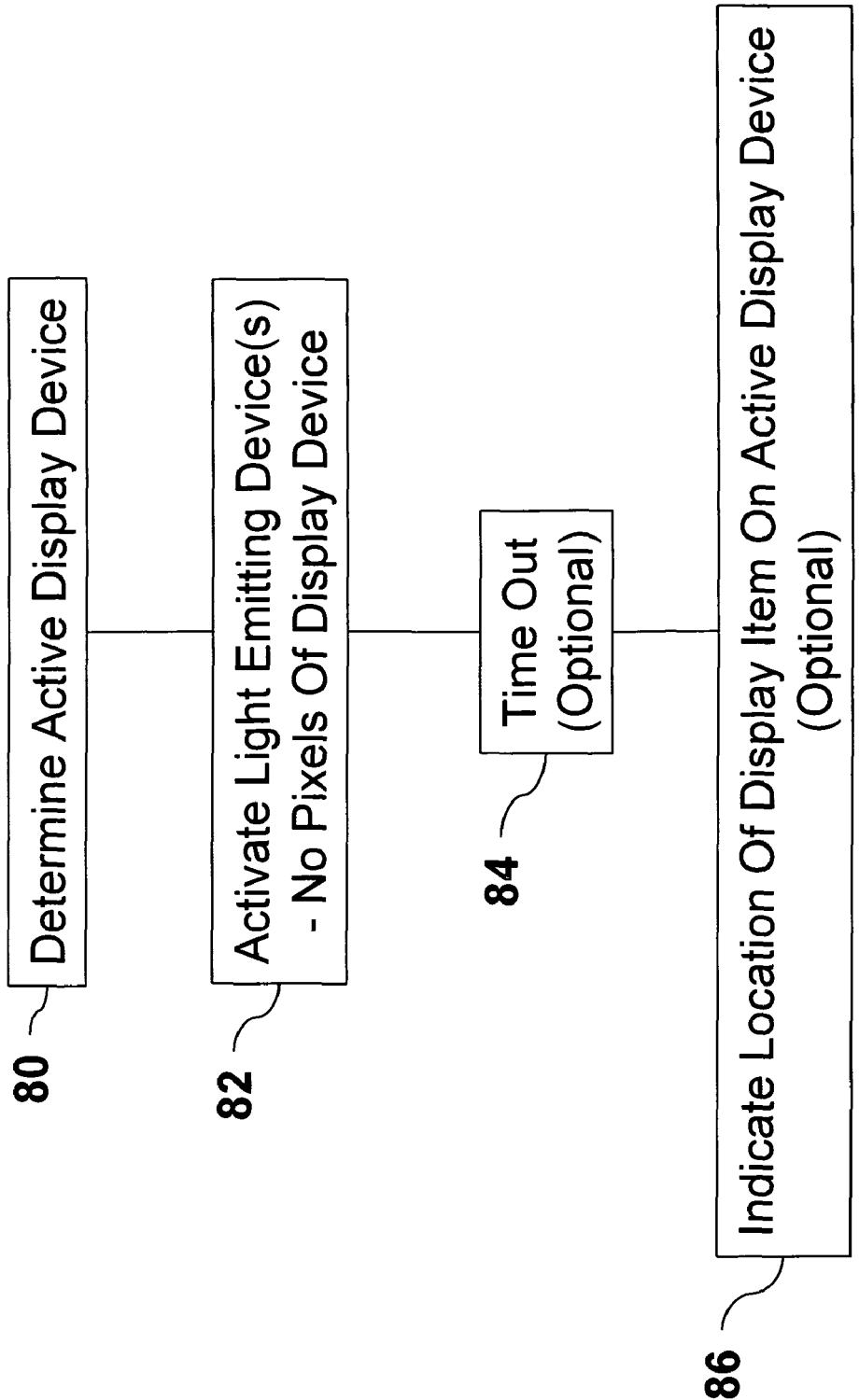
FIG. 9 is a flow diagram of an exemplary process for locating a display item on a display device in a plurality of display devices.

FIG. 9 is a flow diagram of an exemplary process for locating a display item on a display device in a plurality of display devices. The active display device is determined at step 80. That is, the display device on which the display item of interest is located is determined. The display item can comprise any appropriate display item, such as a display cursor (e.g. mouse cursor), a dialog box, a drop-down window, a window in general, a notification, or the like, for example. The display item can be visible on the active display device or can be hidden, awaiting an action. For example, a screen saver or power saver can be active on the active display device, thus obscuring a view of the display item. When an action is taken, such as moving a mouse or entering a keyboard stroke, the screen saver and/or power saver is deactivated and the display item will become visible.

At least one light emitting device associated with the active display device is activated at step 82. As described above a light emitting device can comprise any appropriate device such as an LED, an optical fiber, a light pipe, a plasma display, an LCD, a fluorescent device, an incandescent device, or a combination thereof, for example. Any one or combination of light emitting devices associated with the active display device can be activated. Activation of a light emitting device provides a visual indication of the display device on which the display item is located. Activation of light emitting devices utilizes no pixels of the display devices. Thus, the view of the display item is not obscured by activation of a light emitting device(s). Moreover, activating a light emitting device(s) does not obscure a view of any information being rendered on the active display device.

In an exemplary embodiment, at any point in time, there is at least one activated light emitting device. For example, if the display item of interest is a mouse cursor, as the mouse cursor moves from one display device to another, the associated display device's light emitting device(s) will become activated. The light emitting device(s) remains activated until the mouse cursor is moved to another display device, which results in the light emitting device(s) associated with the new display device to become activated and the previous activated light emitting device(s) to become deactivated.

In another exemplary embodiment, a light emitting device(s) can be deactivated after a predetermined amount of time within which no activity occurs (step 84). For example, if a user does not move the mouse cursor for a period of time, the activated light emitting device(s) will become deactivated. When the mouse cursor subsequently is moved, the light emitting device(s) becomes activated again. In yet another example, a notification (e.g., email has been received) can occur on a display device. The notification can result in activation of the light emitting device(s) associated with the display device that received the notification. The activated light emitting device(s) could become deactivated after a predetermined amount of time. In a scenario combining the previous two examples, it is possible that at a point in time, no light emitting devices are activated. A display device can receive notification of an incoming email and the light emitting device(s) associated with that display device can become activated. The user then moves the mouse, which results in the light emitting device(s) associated with another display device becoming activated (because the mouse cursor is located at the other display device). In this scenario, the user can easily locate the mouse cursor and know where to move the mouse cursor to investigate the received email. When the user moves the mouse, light emitting devices associated with display devices which the mouse cursor traverses will be activated (and subsequently deactivated when the mouse cursor leaves the display device), thus tracking the path of the mouse cursor.

At step 86, in an exemplary embodiment, the location of the display item on the active display device is located. As described above, this can be accomplished by providing a marker on at least one light emitting device, such that a line, or lines, projected from the light emitting device provides an indication of the location of the display item on the display device.

The various techniques described herein can be implemented in connection with hardware or software or, where appropriate, with a combination of both. Thus, the methods and apparatuses for locating a display item on multiple display devices or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for indexing and searching numeric ranges. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations. The methods and apparatuses for locating a display item on multiple display devices also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for locating a display item on multiple display devices. When implemented on a general-purpose processor, the program code combines with the processor to provide a unique apparatus that operates to invoke the functionality of locating a display item on multiple display devices. Additionally, any storage techniques used in connection with locating a display item on multiple display devices can invariably be a combination of hardware and software.

While locating a display item on multiple display devices has been described in connection with the exemplary embodiments of the various figures, it is to be understood that other similar embodiments can be used or modifications and additions can be made to the described embodiments for performing the same functions of locating a display item on multiple display devices without deviating therefrom. Therefore, locating a display item on multiple display devices as described herein should not be limited to any single embodiment, but rather should be construed in breadth and scope in accordance with the appended claims.

What is claimed:

1. An apparatus for providing an indication of a location of a display item, said apparatus comprising:
    light emitting devices associated with each display device of a plurality of display devices, said light emitting devices being located proximate to at least two sides of a perimeter of each display device of said plurality of display devices wherein:
    for an active display device of said plurality of display devices on which said display item is located, at least one of said light emitting devices associated with said active display device is activated;
    said at least one light emitting is located outside any display area of said plurality of said display devices;
    light emitting devices located proximate each of said sides of an active display device comprise a marker; and
    an intersection of lines, projecting from each marker, within said active display device is indicative of a location of said display item.

2. An apparatus in accordance with claim 1, wherein said display item comprises at least one of a display cursor or a notification.

3. An apparatus in accordance with claim 1, wherein at least one light emitting device comprises at least one of a light emitting diode, an optical fiber, a light pipe, a liquid crystal display, a plasma display, a reflective device, or a shutter.

4. An apparatus in accordance with claim 1, wherein:
    a plurality of light emitting devices are located around and proximate to a perimeter of each display device of said plurality of display devices; and
    for an active display device on which said display item is located, said plurality of light emitting devices proximate said active display device is activated.

5. A method for providing an indication of a location of a display item, said method comprising:
    from a plurality of display devices, determining an active display device on which said display item is located;
    activating at least one light emitting device indicative of said active display device without obscuring a view of information being rendered on said active display device, wherein:
    light emitting devices are located proximate to at least two sides of a perimeter of each display device of said plurality of display devices;
    light emitting devices located proximate each of said sides of an active display device comprise a marker; and
    an intersection of lines, projecting from each marker, within said active display device is indicative of a location of said display item.

6. A method in accordance with claim 5, further comprising positioning at least one light emitting device proximate to each display device of said plurality of display devices, wherein said act of activating comprises activating at least one light emitting device proximate to said active display device.

7. A method in accordance with claim 5, further comprising:
    deactivating said activated at least one light emitting device after a predetermined period of inactivity.

8. A method in accordance with claim 5, wherein said display item comprises at least one of a display cursor or a notification.

9. A method in accordance with claim 5, wherein at least one light emitting device comprises at least one of a light emitting diode, an optical fiber, a light pipe, a liquid crystal display, a plasma display, a reflective device, and or a shutter.

10. A method in accordance with claim 5, further comprising:
    positioning a plurality of light emitting devices around and proximate to a perimeter of each display device of said plurality of display devices; and
    for an active display device on which said display item is located, activating said plurality of light emitting devices proximate said active display device.

11. A system for providing an indication of a location of a display item, said system comprising:
    a plurality of display devices;
    light emitting devices located proximate to each display device of said plurality of display devices, said light emitting devices being located proximate to at least two sides of a perimeter of each display device of said plurality of display devices;
    a computing device for:
    determining a location of an active display device of said plurality of display devices on which said display item is located; and
    activating at least one of said light emitting devices proximate said active display device, wherein:
    no pixels rendered by said plurality of display devices are utilized to activate any display device of said plurality of display devices;

light emitting devices located proximate each of said sides of an active display device comprise a marker; and an intersection of lines, projecting from each marker, within said active display device is indicative of a location of said display item.

12. A system in accordance with claim 11, wherein said display item comprises at least one of a display cursor or a notification.

13. A system in accordance with claim 11, wherein at least one light emitting device comprises at least one of a light emitting diode, an optical fiber, a light pipe, a liquid crystal display, a plasma display, a reflective device, or a shutter.

14. A system in accordance with claim 11, wherein:
for an active display device on which said display item is located, said light emitting devices proximate said active display device is activated.

* * * * *